US005607768A

United States Patent [19]

Lee

[11] Patent Number: 5,607,768

[45] **Date of Patent: *Mar. 4, 1997**

[54] LUBRICOUS POLYMER-ENCAPSULATED FERROMAGNETIC PARTICLES AND METHOD OF MAKING

[75] Inventor: Howard H.-D. Lee, Bloomfield Hills, Mich.

[73] Assignee: General Motors Corporation, Detroit, Mich.

[ * ] Notice: The term of this patent shall not extend beyond the expiration date of Pat. No. 5,605,758.

[21] Appl. No.: 440,577

[22] Filed: May 15, 1995

[51] Int. Cl.[6] .......... B32B 5/16

[52] U.S. Cl. .......... 428/403; 252/62.54; 428/407

[58] Field of Search .......... 428/403, 407, 428/412, 900, 473.5, 419, 218, 328; 252/62.54

[56] References Cited

U.S. PATENT DOCUMENTS

| | | | |
|---|---|---|---|
| 4,696,725 | 9/1987 | Ochiai et al. | 252/62.54 |
| 5,198,137 | 3/1993 | Rutz et al. | 252/62.54 |
| 5,211,896 | 5/1993 | Ward et al. | 264/126 |
| 5,272,008 | 12/1993 | Shain et al. | 428/407 |

*Primary Examiner*—Hoa T. Le
*Attorney, Agent, or Firm*—Lawrence B. Plant

[57] ABSTRACT

A mass of ferromagnetic particles encapsulated in a polymeric shell having a plurality of denuded organic lubricant particles adhering to the surface of the shell so as to stand in relief from said surface unimpaired by the polymer or any other binder.

20 Claims, 2 Drawing Sheets

LUBRICOUS POLYMER-ENCAPSULATED FERROMAGNETIC PARTICLES AND METHOD OF MAKING

This invention relates to a mass of ferromagnetic particles each encapsulated in a polymeric shell having a plurality of small, denuded, organic, lubricant particles adhering to the surface of said shell so as to stand in relief from such surface unimpaired by such polymer or any other binder, and to method of making same.

BACKGROUND OF THE INVENTION

It is known to compression mold hard (i.e., permanent) magnets, as well as soft magnetic cores for electromagnetic devices (e.g., transformers, inductors, motors, generators, relays, etc.) from a plurality of ferromagnetic particles each encapsulated in a thermoplastic or thermosetting polymeric shell.

Soft magnetic cores are molded from polymer-encapsulated ferromagnetic particles (i.e., less than about 1000 microns) such as iron, and certain silicon, aluminum, nickel, cobalt, etc., alloys thereof (hereafter generally referred to as iron), and serve to concentrate the magnetic flux induced therein from an external source (e.g., current flowing through an electrical coil wrapped thereabout). Unlike hard magnets, such soft magnetic cores, once magnetized, are very easily demagnetized, i.e., require only a slight coercive force (i.e., less than about 200 Oersteds) to remove the resultant magnetism. Ward et al. U.S. Pat. No. 5,211,896, for example, discloses one such soft magnetic core forming material wherein the polymeric shell comprises a thermoplastic polyetherimide, polyamideimide or polyethersulfone which, following molding, fuses together to (1) form a polymer matrix embedding the iron particles, and (2) so electrically insulate each iron particle from the next as to significantly reduce eddy current losses, and hence total core losses (i.e., eddy current and hysteresis losses), in AC applications of the cores molded therefrom. Other possible matrix-forming thermoplastic polymers for this and other purposes include the polysulfones, polycarbonates, polyphenylene ethers, polyphenylene oxides, polyacrylic acids, polyvinylpyrrolidone, and polystyrene maleic anhydride among others.

Permanent (i.e., hard) magnets are also known to be compression molded from such ferromagnetic particles as magnetic ferrites, rare-earth metal alloys (e.g., Sm-Co, Fe-Nd-B, etc.), and the like, and are subsequently permanently magnetized. Shain et al. U.S. Pat. No. 5,272,008, for example, discloses one such hard magnet-forming material comprising iron-neodymium-boron alloy particles encapsulated in a composite polymeric shell comprising a thermosetting, matrix-forming, epoxy underlayer overcoated with a thermoplastic polystyrene outer layer. The polystyrene keeps the epoxy coated particles from sticking together before the epoxy is cured.

In Ward et al. U.S. Pat. No. 5,211,896 and Shain et al. U.S. Pat. No. 5,272,008, the shell-forming polymers are dissolved in an appropriate solvent, and mixed with a fluidized stream of the ferromagnetic particles by spray-coating the particles with the solution, using the so-called "Wurster" process. Wurster-type spray-coating equipment comprises a cylindrical outer vessel having a perforated floor through which a heated gas passes upwardly to heat and fluidize a batch of ferromagnetic particles therein. A concentric, open-ended, inner cylinder is suspended above the center of the perforated floor of the outer vessel. A spray nozzle centered beneath the inner cylinder sprays a solution of the shell-forming polymer, dissolved in a solvent, upwardly into the inner cylinder (i.e., the coating zone) as the fluidized ferromagnetic particles pass upwardly through the spray in the inner cylinder. The particles circulate upwardly through the center of the inner cylinder and downwardly between the inner and outer cylinders. The gas (e.g., air) that fluidizes the metal particles also serves to vaporize the solvent causing the dissolved, shell-forming polymer to deposit as a film onto each particle's surface. After repeated passes through the coating zone in the inner cylinder, a sufficient thickness of polymer accumulates over the entire surface of each particle as to completely encapsulate such particle. Ferromagnetic particles have also been coated with polymers by simply mixing the particles in a suitable vessel with the coating polymer dissolved in a suitable solvent, and then volatizing the solvent to dry the particles and leave the polymer adhering the surfaces thereof.

Lubricants have heretofore been added to polymer-encapsulated ferromagnetic particles. Rutz et al. U.S. Pat. No. 5,198,137, for example, mechanically blends or mixes boron nitride lubricant particles with polymer encapsulated particles prior to molding the particles into finished products to improve the flowability of the powder and the magnetic permeability of moldings made therefrom, as well as to reduce the stripping and sliding die ejection pressures. Moreover, certain lubricous stearates, such as ethylene bisstearateamide lubricant particles—sold commercially under the trade name ACRAWAX™), have heretofore been dry mixed/blended with polymer-encapsulated metal particles to improve processability of the particles.

Moreover, my earlier invention, copending U.S. patent application Ser. No. 08/357,890 filed in the names of D. Gay and myself on Dec. 16, 1994 and assigned to the assignee of the present invention provides a mass of ferromagnetic particles each of which is encapsulated in a lubricous polymeric shell comprising a plurality of organic, lubricant particles essentially buried in a film of a soluble thermoplastic binder on the surface of each of the polymer-encapsulated ferromagnetic particles. As these lubricant particles are bonded to the surfaces of the ferromagnetic particles, they are not susceptible to subsequent segregation, and significantly improve (1) the dry particle flowability and hot compactability (i.e., densification) of the encapsulated particles, and (2) the electrical resistivity of moldings made therefrom. High resistivity and high density moldings make the best soft magnetic cores for high frequency AC applications as they provide both high magnetic permeability (attributable to higher density) and low core losses (attributable to good interparticle insulation).

While my prior invention. (i.e., U.S. Ser. No. 08/357,890 supra) significantly improved the properties of polymer-encapsulated ferromagnetic particles and moldings made therefrom, the full effectiveness of the organic lubricant particles used therein is impaired somewhat by the binder which anchors the lubricant particles to the ferromagnetic particles. In this regard the binder, for the most part, either buries or so coats the lubricant particles that their full potential as lubricants is not realized.

SUMMARY OF THE INVENTION

The present invention provides lubricous, polymer-encapsulated ferromagnetic particles and a method of making same, which particles have small (i.e., less than about 100 micrometers) denuded, organic lubricant particles adhering only to the very surface of each polymer-encapsulated ferromagnetic material much like flies adhere to flypaper. Indeed, only the roots of the lubricant particles are attached to the outside surface of the polymer shell leaving the denuded remainder of each lubricant particle prominent, and standing in relief from, such surface unimpaired by the polymer shell or any other binder. The lubricous, polymer-encapsulated ferromagnetic particles of the present invention are made by a simple cost-effective process which eliminates the cost of a separate binder for the lubricant particles, and the solvation and handling costs associated therewith. Rather, the present invention contemplates a method of adhering small, denuded, organic lubricant particles onto the surfaces of a plurality of polymer-encapsulated ferromagnetic particles without a separate binder by: (1) mixing the polymer-encapsulated ferromagnetic particles with a slurry of the lubricant particles in a liquid vehicle (sans any binder) which is a tackifier for the polymer shell so as to tackify the surface of the polymer shell and adhere the lubricant particles at their roots to such surface; and (2) removing the vehicle from the polymer-encapsulated particles to detackify the surface of the shell and leave each of the lubricant particles adhering thereto only at their roots so as to leave the denuded remainder of the lubricant particles exposed unimpaired, prominent and standing in relief from, the outer surface of the polymer shells. The tackifier will preferably comprise a tailored mixture of a solvent and nonsolvent for the polymer constituting the outer surface of the polymer shell encasing the ferromagnetic particle. By adjusting the ratio of the nonsolvent to the solvent, it is possible to tailor the solubility of the liquid mixture to such an extent as to only soften, swell or otherwise tackify the surface of the polymer shell without appreciable dissolution thereof. Under these circumstances, the lubricant particles attach themselves only onto the surface of the shell and do not become buried in or coated by the shell's polymer or any other binder which impairs the effectiveness of the lubricant. Hence lubricity of the entire particle mass is improved and electrical resistivity greatly improved.

The polymer shell may comprise a single polymer layer, or two or more different polymers layered atop one another for better interparticle insulation. When two layers are used, only the top layer is tackified in accordance with the present invention to adhere the organic lubricant particles to the surface thereof. In a most preferred embodiment, the top layer will have a lower melt flow temperature than the underlayer for best densification without loss of interparticle insulation (see U.S. Ser. No. 08/357,890 supra).

Organic lubricant particles useful with the present invention include both natural and synthetic polymers. Hence polymers such as cornstarch, fluorocarbons, stearates, polydienes, polyalkenes, polyacrylic acid and its derivatives, polystyrenes, polyoxides, polyesters, polycarbonates, polyamides, polyvinyl esters, and polyvinylpyrrolidone, are seen to be useful, so long as their particle size is less than that of the host polymer-encapsulated ferromagnetic powder to which they adhere. Preferably, the particle size of the lubricant will be significantly smaller (i.e., at least an order of magnitude smaller) than the host particle. Preferred organic lubricants for soft magnetic cores are fluorocarbons such as 4-fluorinated ethylene resin, perfluoroalkoxyethylene (PFA), 6-fluorinated propylene (PEP), per-fluoroalkoxyethylene (EPE), 3-fluorinated ethylene chloride (PCTFE), 3-fluorinated ethylene chloride and ethylene (ECTFE), 4-fluorinated ethylene and ethylene copolymer (ETFE), fluorinated vinylidene (PVDF), fluorinated vinyl resin (PVE). The most preferred fluorocarbon is polytetrafluoroethylene (PTFE).

While any permanently magnetizable ferromagnetic particle material may be used, a preferred mass of moldable, permanently magnetizable particles comprises iron-neodymium-boron particles each encapsulated in an uncured epoxy with denuded ethylene bisstearateamide (i.e., ACRAWAX™) lubricant particles adhering to the surface of the uncured epoxy. A most preferred such permanently magnetizable particles will have a thin layer of polystyrene covering the uncured epoxy with the ACRAWAX™ particles adhering to the surface of the polystyrene layer.

A preferred mass of moldable, soft magnetic core-forming particles made in accordance with the present invention comprises iron particles encapsulated in a polyetherimide (e.g., commercially available as ULTEM™ from GE Plastics) shell with denuded polytetrafluoroethylene (PTFE) (i.e., Teflon™) lubricant particles adhering prominently to the surface of the ULTEM™ shell. Such PTFE-coated ferromagnetic particles have produced moldings having higher electrical resistivities than moldings made from any other particles including those made by simply mechanically mixing/blending the ferromagnetic particles with the PTFE or those made from polymer-encapsulated iron particles with PTFE particles embedded in a binder on the surface of the polymer shell.

The lubricant particles of the present invention are desirably smaller than those that are used with a binder such as disclosed in my copending patent application supra. Hence while lubricant particles less than about 100 micrometers are useful, particles less than about 30 micrometers are preferred, and about 0.1–0.2 micrometers are most preferred. The smaller lubricant particles provide more coverage of the ferromagnetic surface for a given weight of lubricant. Because the lubricant particles are small, are denuded (i.e., uncovered and unimpaired by a binder) and are concentrated only on the outermost surface of the polymer-encapsulated ferromagnetic particles, the total amount of lubricant particles used may be somewhat less than that used in U.S. Ser. No. 08/357,890 for producing the same results. Lubricant loadings of less than about 0.2% by weight of the entire particle mass yield polymer-encapsulated ferromagnetic particles which have better dry flowability, and yield higher density moldings than similar particles which are not coated with organic lubricant particles. Above about 0.2 weight percent ACRAWAX™, flowability of the polymer-encapsulated particles remains good, but the density begins to fall off as a result of the increased organic content of the molded mass. PTFE loadings between about 0.05 percent by weight and about 0.5 percent by weight are effective, with about 0.1 percent to about 0.3 percent being preferred to provide the desired benefits for soft magnetic cores without adversely affecting density of the molding. Higher loadings (e.g., 1%) may, of course, be used but with insufficient benefit to offset the loss in product density.

The lubricant particles may be stuck to the surface of the polymer-encapsulated ferromagnetic particles by simply stirring the polymer-encapsulated ferromagnetic particles into a slurry of the lubricant particles suspended in a liquid vehicle which is a tackifier for the polymer, and then removing the tackifier (e.g., by vaporization). Preferably however, the lubricant particles are deposited more uniformly onto the surfaces of polymer-encapsulated ferromagnetic particles using a fluidized stream type spray-coating method (e.g., Wurster process supra). In this spray-coating method, a slurry comprising a suspension of the lubricant particles in a tackifier for the polymer shell is sprayed into a fluidized stream of the polymer-encapsulated ferromagnetic particles, and the tackifier evaporated so as to leave the lubricant particles adhering prominently to the surface of the polymer shell.

The lubricant-coated, polymer-encapsulated ferromagnetic particles are free-flowing, and each carries with it its own denuded lubricant adhering prominently from its surface. As a result, the lubricant particles are distributed substantially evenly throughout the particle mass, along with the host ferromagnetic particles that carry them, and are not susceptible to segregation or separation therefrom during handling/processing. Moreover, denuded lubricant particles, unimpaired by the shell's polymer or any other binder, are located on the exterior surfaces of the host ferromagnetic particles precisely where they are needed most to improve the dry flowability and hot compressibility of the particles which, in turn, promotes the densification of the particles to a degree heretofore unachievable with lubricants which were merely mechanically mixed/blended into the ferromagnetic particle mass. Moreover, such lubricant-coated, polymer-encapsulated particles yield moldings which have higher electrical resistivities than comparable moldings produced from particles where the lubricant particles are buried in a binder on the surface of the host particles.

The lubricant-coated, polymer-encapsulated, ferromagnetic particles are molded by placing them in a mold, and compressing them under sufficient pressure (i.e., with or without heating depending on the composition of the polymer shell) to cause the polymer shells of the several ferromagnetic particles to fuse, or otherwise bond (e.g., cross-link), together to form a finished molding having the ferromagnetic particles distributed substantially uniformly throughout, i.e., each separated from the next by the encapsulating polymer.

DETAILED DESCRIPTION OF SPECIFIC EMBODIMENTS OF THE INVENTION

Figure 1:
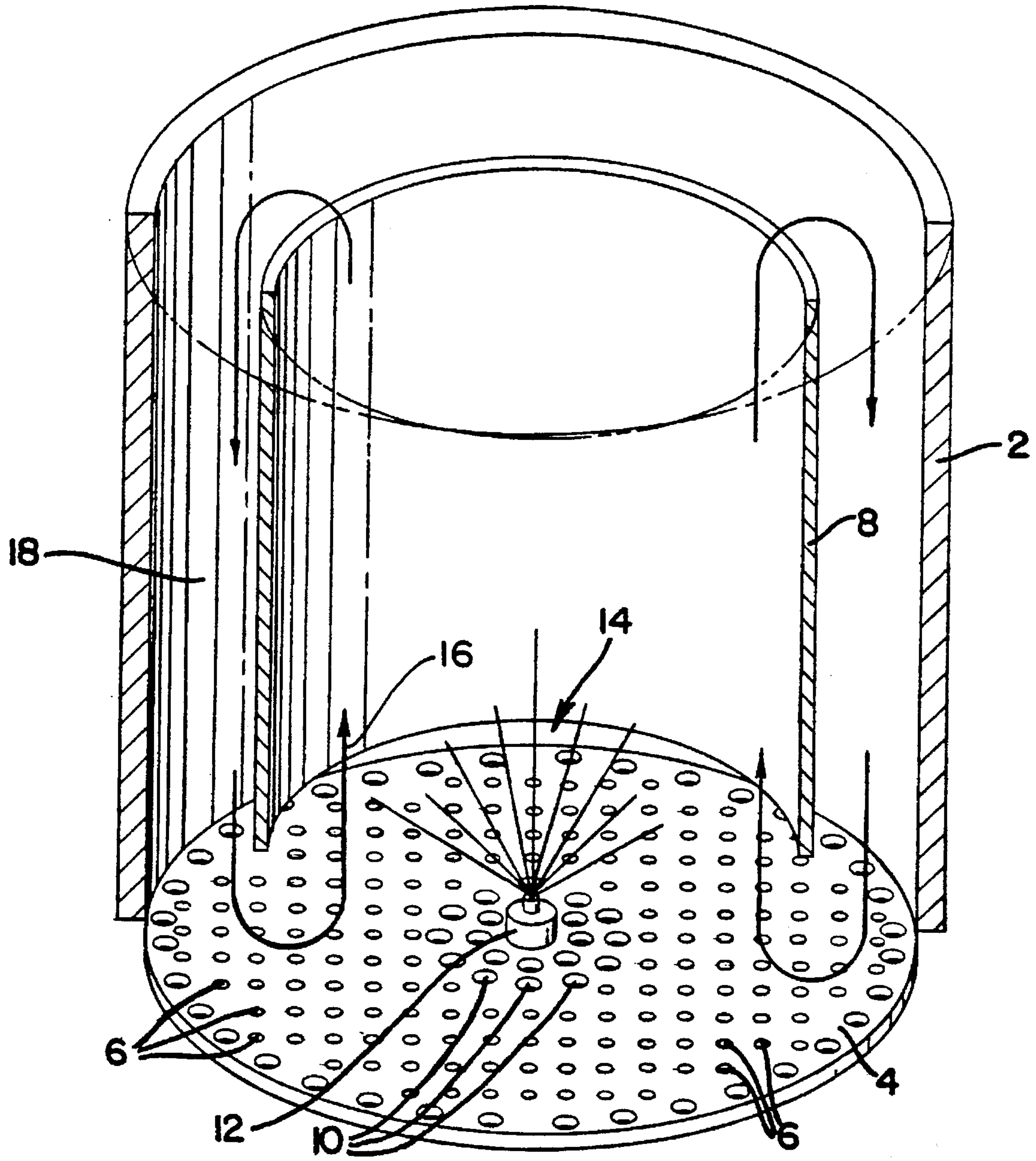
FIG. 1 illustrates, in a sectioned perspective view, a Wurster-type fluidized stream coater.

Polymer-encapsulated, ferromagnetic particles each have a plurality of small, organic, lubricant particles adhering prominently to the surface of the polymer shell encapsulating each ferromagnetic particle. The shell may comprise a single polymer, but will preferably comprise at least two layers of different polymers. The organic lubricant particles will be stuck to the surface of the outermost layer. The lubricant particles are stuck to the surface of each polymer shell by tackifying the surface of the shell in the presence of the lubricant particles. This is conveniently accomplished by suspending the lubricant particles in a liquid vehicle which is a tackifier for the surface of the polymer shell. The tackifier for the polymer surface is then removed leaving the lubricant particles clinging to the surface of the shell encasing each of the ferromagnetic particles in much the same way that flies adhere to fly paper. The lubricant particles each have a root portion rooted in the outermost surface of the polymer shell, and a prominent portion extending from the root portion so as to stand in relief from such surface denuded of the polymer encapsulating the ferromagnetic particles or any other binder which might bury, coat or otherwise impair the lubricousness of the lubricant particles. About 10% to about 40% of each of the lubricant particles (i.e., the roots) is anchored in the surface with the remainder standing in relief from the surface. Significantly, the denuded lubricant particles are concentrated on the outermost surface of the shell where their lubricity is most effectively utilized to promote better flowability and optimal densification of products hot compression molded from the particles.

The amount of lubricant particles will vary with the application (i.e., hard or soft magnet), the composition of the lubricant, the size of the lubricant particles, and the composition of the polymer encapsulating the ferromagnetic polymers. Generally, the lubricant particles will constitute about 0.05% to about 0.5% by weight of the total mass of the encapsulated ferromagnetic and the lubricant particles. For rare earth hard magnetic particles (e.g., Fe-Nd-B) using ACRAWAX™ lubricant particles stuck to the surface of an epoxy encapsulating shell, no more than about 0.3% by weight of ACRAWAX™ is needed to provide good dry particle flowability and product density. Such flowability is attainable at higher ACRAWAX™ loadings too, but product density drops. Similarly, for soft magnetic cores made from iron particles encapsulated in a polyetherimide shell, no more than about 0.5% PTFE particles are needed to maximize particle flowability, and provide increased density and electrical resistivity in moldings made from the particles. More than about 0.5% PTFE results in lower density, and weaker moldings. Hence while lubricous concentrations higher than 0.5 (e.g., ca. 1.0%) are possible, there appears to be no benefit to be gained therefrom. Generally, lubricant content should be minimized consistent with the needs of the product and the process for making same. ACRAWAX™ loadings of about 0.3 percent by weight, and PTFE loadings of about 0.1 percent to about 0.3 percent are preferred for their respective permanent magnet and soft magnetic core applications.

The ferromagnetic particles will typically be less than about 1000 micrometers in size and have an average particle size between about 5 microns and about 500 micrometers (preferably about 100 to about 180 micrometers). Preferred iron particles are commercially available from the Hoeganaes Company as grade 1000C (average ca. 100 micrometers), or SC 40 (average ca. 180 micrometers). Ferrites suitable for making hard magnets will range in size from about 1 micrometer to about 100 micrometers with an average size of about 20 micrometers to about 60 microns. Rare-earth ferromagnetic particles (e.g., Sm-CO, or Fe-Nd-B) for making hard permanent magnets will typically range in size from about 10 micrometers to about 300 micrometers with an average particle size of about 100 micrometers.

The lubricant particles clinging to the surface of the polymer shell encasing ferromagnetic particles will be much smaller than the host ferromagnetic particles that support and carry them so that a significant number of the lubricant particles can readily adhere to, and cover the surface of, the polymer shell encasing the ferromagnetic particle. The mean lubricant particle size will vary with the particular lubricant chosen, and generally will be less than about 30 micrometers in size. Submicron sized PTFE particles are preferred (most preferably ca. 0.1-ca. 0.2 micrometers) as they provide a more uniform deposit on each host particle, and can be used at lower loading levels than larger lubricant particles.

The lubricant particles are suspended in a vehicle (sans a binder) which is a tackifier for the polymer constituting the shell encasing each host ferromagnetic particle. The lubricant will preferably be suspended in the vehicle first and the host particles added thereto. Alternatively, the lubricant particles could be added to a suspension of the host particles in the vehicle. Deposition of the lubricant particles can also be effected using spray-coating technology. The choice of tackifier is dependent on the composition of the polymer shell of the host ferromagnetic particles. Preferably, the properties of the tackifier vehicle will be tailored to provide a very sticky surface without dissolving any appreciable amount of the shell polymer. Such tailoring can effectively be accomplished by preparing a vehicle which is a mixture of a solvent and a nonsolvent for the shell polymer. For example, shells comprising polyetherimide (ULTEM™) can readily be tackified, without appreciable dissolution of the shell, utilizing a vehicle mixture consisting of methylene chloride (a solvent for ULTEM™), and acetone (a nonsolvent for ULTEM™). Such a mixture partially dissolves and swells the surface of the ULTEM™. A suitable tackifier for high molecular weight poly(methyl methacrylate) comprises a mixture of acetone (solvent) and hexane (nonsolvent). A suitable tackifier for polystyrene comprises methylethyl ketone (solvent) and methanol (nonsolvent). A suitable tackifier for polyacrylic acid comprises ethanol (solvent) and hexane (nonsolvent). Other shell-tackifier combinations are readily determinable from handbooks and routine experimentation.

Following coating of the host particles with a thin layer of denuded lubricant particles, the tackifying vehicle is removed, as for example, by filtration and drying, or volatilization by simply tumbling the suspension in a stream of warm air until the vehicle vaporizes and leaves a dry, free-flowing particle mass. Removal of the tackifier causes the surface of the shell to harden and anchor the roots of the lubricant particles therein.

After detackifying the surface of the shell and anchoring the roots of the lubricant particles thereto, the encapsulated ferromagnetic particles are compression molded to the desired shape using sufficient temperature and pressure to cause the polymer comprising the encapsulating shell to fuse (e.g., for a thermoplastic), or otherwise bond (e.g., cross-link for a thermoset), together and completely embed the ferromagnetic particles in a continuous matrix of such polymer. Molding pressures will typically vary from about 30 tons per square (tsi) inch to about 100 tsi and preferably about 40 tsi to about 50 tsi for room temperature molding. The molding temperature will depend on the composition of the polymer encapsulating the ferromagnetic particles.

The unimpaired/denuded lubricant particles prominent an the surfaces of the shells encasing the ferromagnetic particles promote excellent dry flowability of the particle mass, and densification of the encapsulated particles during molding. Moreover, soft magnetic cores molded from polymer-encapsulated ferromagnetic particles having denuded PTFE particles projecting from the surfaces of the polymer in accordance with the present invention have demonstrated significantly higher electrical resistivities than cores having the PTFE particles buried in a binder on the surfaces of the encapsulated ferromagnetic particles.

For permanent magnets, the ferromagnetic particles comprise permanently magnetizable materials such as ferrites, rare-earth magnet alloys, or the like, having an average particle size of about 20 micrometers to about 100 micrometers (e.g., 100 micrometers for FeNdB particles), and the shell will preferably comprise two distinct polymer layers. The first or underlayer: (1) comprises the primary polymer for forming the polymer matrix in the finished molding; (2) is deposited as a discrete first layer directly atop the ferromagnetic particles; and (3) preferably comprises polyamides such as Nylon 11™, Nylon 6™ and Nylon 612™, or epoxies such as NOVELAC™ from Shell Chemical Co. However, other polymers such as polyvinylidine difluoride (PVDF), may also be used. The second or overlayer will preferably comprise polystyrene, though other thermoplastics such as polycarbonate, polysulfone, or polyacrylates may be used in the alternative. The lubricant particles to be adhered to the overlayer preferably comprise lubricous organic stearates having an average particle size between about 1 micrometer and about 15 micrometers, and will most preferably comprise ethylene bisstearateamide particles marketed under the trade name ACRAWAX™. Fluorocarbon lubricants (e.g., PTFE) may be used in lieu of the ACRAWAX™. The lubricant particles are suspended in a liquid vehicle which is a tackifier for the overlayer. Hence, for a polystyrene overlayer, the tackifier may comprise methyl ethyl ketone, dimethyltrahydrofuran, or toluene as solvent, preferably a 95:5 to 89:11 mixture (by weight) of methyl ethyl ketone (solvent) and methanol (nonsolvent).

For soft magnetic cores (e.g., iron ferromagnetic particles), the shell-forming polymer will comprise thermoplastic polyetherimides (preferred) polyamideimides, polysulfones, polycarbonates, polyphenylene ethers, polyphenylene oxide, polyacyclic acid, poly(vinylpyrrolidone), and poly(styrene maleic anhydride). The lubricant particles will preferably comprise lubricous fluorocarbons, and most preferably polytetrafluoroethylene (PTFE).

The lubricant particles are suspended in a liquid vehicle which is a tackifier for the polymer shell encasing the ferromagnetic particle. Hence for example, a tackifier comprising a 0.08:1 (by weight) mixture of acetone and methylene chloride is suitable for use with ferromagnetic particles having a polyetherimide polymer shell. The amount of lubricant in the suspension/slurry is not critical, but will be affected by a number of considerations. Generally, a thinner slurry (i.e., low lubricant loading) will result in a more uniform distribution of the lubricant throughout the particle mass, but requires the removal of more vehicle and accordingly increases costs. As a practical matter, the concentration chosen will be a compromise between the needs of the product and the needs of the process.

The tackifier-lubricant slurry is preferably sprayed onto a fluidized stream of the iron particles in a Wurster-type apparatus schematically illustrated in FIG. 1. Essentially, the Wurster-type apparatus comprises an outer cylindrical vessel 2 having a floor 4 with a plurality of perforations 6 therein, and an inner cylinder 8 concentric with the outer vessel 2 and suspended over the floor 4. The perforations 10 and 20 at the center of the floor 4 and at the periphery of the plate 4 respectively are larger than those lying therebetween. A spray nozzle 12 is centered in the floor 4 beneath the inner cylinder 8, and directs a spray 14 of the lubricant-tackifier slurry into the coating zone within the inner cylinder 8. The polymer-encapsulating iron particles (not shown) to be encapsulated are placed atop the floor 4, and the vessel 2 closed. Sufficient warm air is pumped through the perforations 6 in the floor 4 to fluidize the particles and cause them to circulate within the coater in the direction shown by the arrows 16. In this regard, the larger apertures 10 in the center of the floor allow a larger volume of air to flow upwardly through the inner cylinder 8 than in the annular zone 18 between the inner and outer cylinders 8 and 2, respectively. As the particles exit the top of the inner cylinder 8 and enter the larger cylinder 2, they decelerate and move radially outwardly and fall back down through the annular zone 18.

The large apertures 20 adjacent the outer vessel provide more air along the inside face of the outer wall of the outer vessel 2 which keeps the particles from statically clinging to the outer wall as well as provides a transition cushion for the particles making the bend into the center cylinder 8. During startup, the particles are circulated by the heated air passing through the floor 4, in the absence of any liquid spray, until they are heated to a desired temperature suitable to tackify the polymer shell thereon when exposed to the tackifier. After the particles have been thusly preheated, the desired tackifier-lubricant slurry is pumped into the spray nozzle 12 where a stream of air sprays it upwardly into the circulating bed of particles, and the process continued until the surface of the shell is tackified, the roots of the desired amount of lubricant particles have been anchored thereto and finally the tackifier is evaporated leaving free flowing particles in the coater. Sonic or ultrasonic vibrations, or the like, may be applied to the plumbing conducting the slurry to the nozzle from the mixing tank to keep the lubricant particles in suspension all the way to the nozzle 12. The amount of air needed to fluidize the ferromagnetic particles varies with the batch size of the particles, the precise size and distribution of the perforations in the floor 4, and the height of the inner cylinder 8 above the floor 4. Air flow is adjusted so that the bed of particles becomes fluidized and circulates within the coater as described above.

After depositing the denuded lubricant particles onto the host polymer-encapsulated particles, the mass of particles is compression molded to the desired shape using sufficient temperature and pressure to cause the shell-forming polymer particles to fuse (i.e., thermoplastics), or otherwise bond (i.e., cross-link for thermosets), together to form a matrix which completely embeds the ferromagnetic particles therein. For thermoplastic matrix polymers, elevated temperatures will preferably be used to accelerate the molding process and obtain maximum densification of the molding. For thermosetting polymers flowable at room temperature (e.g. certain epoxies), no elevated temperatures are required, and room temperature molding is sufficient to cause the shells to coalesce one with the next to form the continuous matrix phase of the composite.

Figure 2:
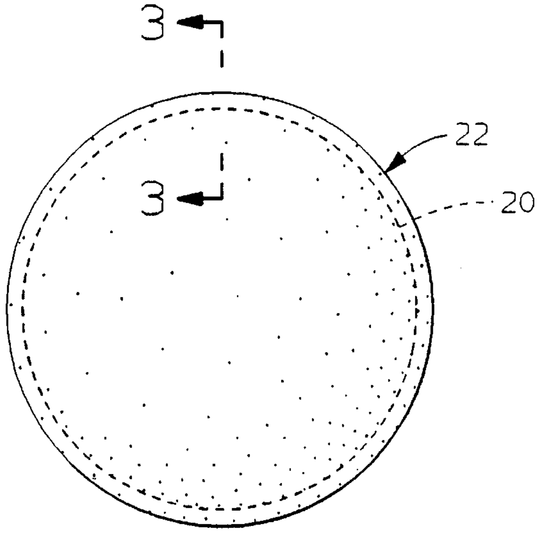
FIGS. 2 & 4 illustrate lubricant-coated, polymer-encapsulated ferromagnetic particles in accordance with the present invention.
Figure 3:
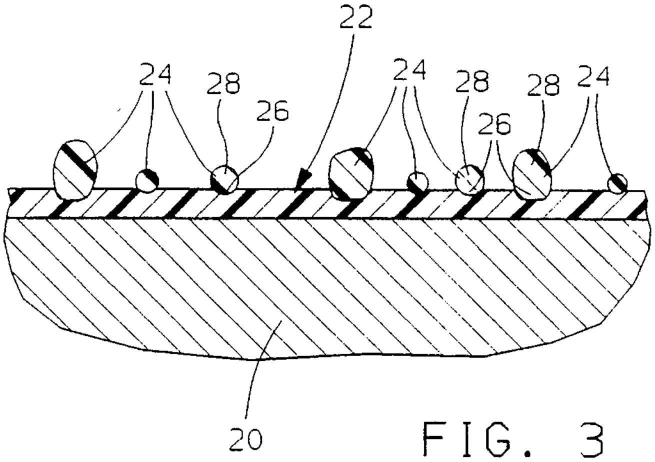
FIGS. 3 & 5 illustrate magnified portions of FIGS. 2 and 4, taken in the direction 3—3 and 5—5 respectively.

FIGS. 2 and 3 illustrate one embodiment of the present invention wherein the ferromagnetic core 20 is encapsulated in a monolayer, polymeric shell 22 having a plurality of insoluble organic lubricant particles 24 stuck to the outermost surface thereof. More particularly, the lubricant particles 24 have root portions 26 anchored to, or rooted in, the surface of the polymer layer 22 and denuded, prominent portions 28 standing in relief above the surface and unimpaired by the polymer comprising the shell 22, or any other binder.

Figure 4:
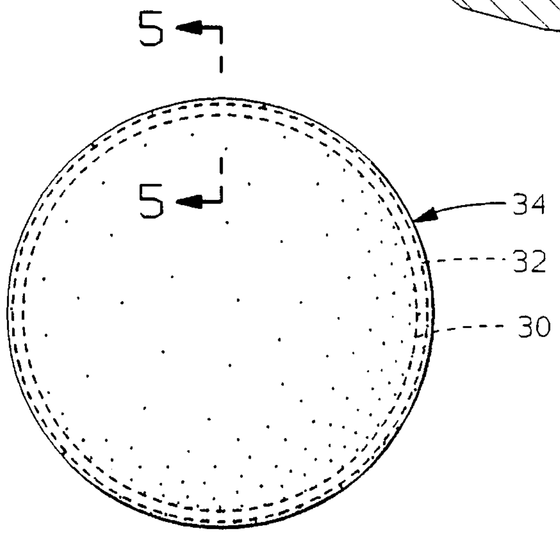
Figure 5:
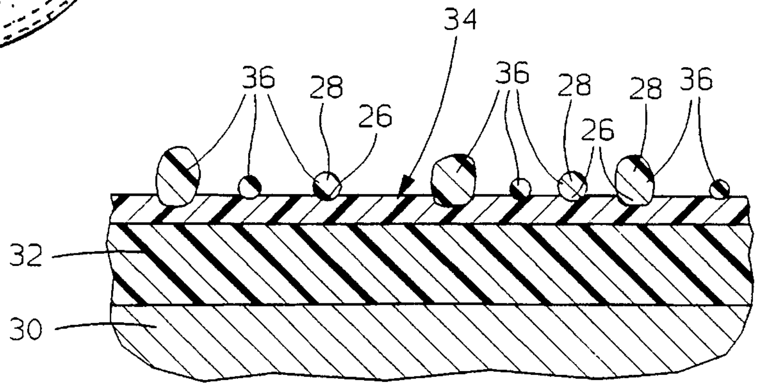

FIGS. 4 and 5 illustrate a preferred embodiment of the present invention wherein the ferromagnetic core 30 has a first polymer underlayer 32 (which polymer is the primary shell-forming polymer), covered by a second polymer overlayer 34 (which polymer enhances interparticle insulation), and a plurality of lubricant particles 36 stuck to the outermost surface of the overlayer.

For molding soft magnetic cores, the shells on the ferromagnetic particles will preferably comprise about 0.25% to about 2.5% by weight of the encapsulated iron particles (preferably about 0.4% to about 0.8%) and the PTFE lubricant particles will comprise about 0.05% to about 0.5% by weight of the encapsulated iron particles. A preferred combination comprises iron particles having a polymer shell comprising polyetherimide (i.e., ULTEM™ from the General Electric Co.) with a layer of polytetrafluoroethylene (PTFE) particles stuck to the surface of the ULTEM™ shell as described above. A most preferred embodiment comprises the aforesaid ULTEM™-coated iron particles overcoated with a layer of methyl methacrylate-butyl methacrylate (i.e., ACRYLOID B-66 from Rohm & Haas) and having the PTFE particles adhering to the surface of the polyacrylate overcoat. When molded at ca. 70° F. and 50 tons/in.$^2$, such ULTEM™-polyacrylate-PTFE coated ferromagnetic particles yielded moldings having higher densities (i.e., as high as 7.6 g/cc), and higher electrical resistivities (i.e., as high as 0.85 ohm-cm) than with any other shell-lubricant combination tested. This resistivity is almost three times (3×) the resistivity of other coating-lubricant combinations tested.

EXAMPLES

To illustrate, the invention, compression molded samples were prepared from polymer-encapsulated iron particles prepared in different ways. More specifically, the samples of the following examples were prepared using an iron powder sold by Hoeganaes Corporation as their grade 1000C powder. The iron particles were each coated with, or encapsulated in, a polymer shell by dissolving the polymer in a suitable solvent, mixing the iron particles (i.e., as a slurry) into the dissolved polymer and aerating the slurry with blowing air to evaporate the solvent and leave a continuous polymer shell/coating on each iron particle.

The thusly coated iron particles were then treated in various ways as set forth in the following specific examples to illustrate various aspects of the present invention. In those examples where lubricated particles were adhered only to the surface of the polymer shell, the lubricant particles were suspended in a tackifier for the polymer shell and the polymer-encapsulated iron particles mixed therewith in essentially the same manner as the iron particles were encapsulated in the polymer shell. The tackifier merely swells, softens or otherwise only slightly dissolves the surface of the shell so as to render it sticky/tacky enough to attach the roots of the lubricant particles thereto, much like flies stick to the surface of flypaper.

Following mixing, the vehicle is evaporated off by a stream of air and the particle mass atmospherically dried at about 30° C. to about 80° C. for 30 minutes to insure complete vehicle removal. The thusly prepared samples were placed in a stainless steel die and compression molded at room temperature and 50 tons/sq. in. (tsi).

EXAMPLE 1

A standard sample was prepared for purposes of comparison with other samples prepared in accordance with this present invention. 15 g of Hoeganaes 1000C iron particles were coated with ULTEM 1000™ (i.e., polyetherimide) by dissolving 0.06 g of the ULTEM™ into 4.0 g of methylene chloride and hand mixing/stirring the iron particles therewith in a beaker. A gentle current of air passed over the slurry and stirring continued until the iron particles were coated with ULTEM™ and free flowing. The particles were subsequently heated to between about 50° F. and 80° F. for 30 minutes to insure complete drying and removal of the solvent.

Samples made from these particles by compression molding at room temperature and 50 tons/sq. in (tsi) pressure yielded a resistance of about 0.03 ohm-cm.

EXAMPLE 2

Iron powder was coated with ULTEM™ in the same manner as in Example 1. The coated iron particles were then mixed with a slurry comprising 0.03 g PTFE powder (MP 1100) in the size range of about 0.2–0.3 microns, and 4.0 g of acetone (a nonsolvent for the ULTEM™)—sans any binder. When the acetone was evaporated, the PTFE particles did not adhere to the surface of the ULTEM™ shell, but rather were only in loose admixture therewith. Moldings made in the same manner as described in Example 1 yielded an electrical resistance of 0.06 ohm-cm which from a practical standpoint (i.e., in terms of reducing core losses) is not much different than the 0.03 ohm-cm obtained in Example 1 (i.e., without any PTFE present).

EXAMPLE 3

Iron powder was coated with ULTEM™ in the same manner as Example 1. The thusly coated iron powder was then mixed with a slurry comprising 0.03 g of cornstarch (ca. 10–20 microns) dispersed in a liquid vehicle comprising 5.0 g of methylene chloride (i.e., an ULTEM™ solvent) and 0.40 g of acetone (i.e., a nonsolvent for ULTEM™)—sans any binder. The solvent/nonsolvent mixture and tackified the ULTEM™ surface, with little dissolution of the ULTEM™, such that upon removal of the tackifying vehicle and drying of the mass, the cornstarch particles adhered prominently to the surface of the shell, and stood in relief from such surface substantially denuded of any binder which would impair the lubricity of the cornstarch. Moldings molded as set forth in Example 1 yielded an electrical resistivity of 0.17 ohm-cm—more than five times (5×) better than the lubricant-free sample (i.e., Example 1), and almost three times (3×) better than the sample with the unattached PTFE (i.e., Example 2).

EXAMPLE 4

Iron powder was coated with ULTEM™ in the same manner as Example 1. The thusly coated iron powder was then mixed with a slurry comprising 0.03 g of PTFE dispersed in 4.0 g of methylene chloride (sans any binder). The methylene chloride dissolved most of the ULTEM™ coating such that upon removal of the methylene chloride the ULTEM™ redeposited onto the iron particles in such a manner as to bury or coat much of the PTFE particles and thereby impair their lubricity. A molding made from these particles in the manner described in Example 1 yielded an electrical resistivity of 0.29 ohm-cm. The process of this example is akin to that described in U.S. patent application Ser. No. 08/357,890 supra wherein lubricant particles are buried in, or covered by a film of polymer.

EXAMPLE 5

Iron powder was coated with ULTEM™ in the same manner as Example 1. The thusly coated iron powder was then mixed with a slurry comprising 5 g methylene chloride, 0.4 g acetone and 0.03 g PTFE (TEFLON MP 1100™). The methylene chloride-acetone (i.e., solvent-nonsolvent) mixture tackified the surface of the ULTEM™ shell causing the PTFE particles to adhere to such surface and leave a large portion of each PTFE particle denuded standing prominently in relief from the surface of the shell. A molding made from these particles in the manner described in Example 1 yield a resistivity of 0.87 ohm-cm which is three times (3×) better than the sample of Example 4 (i.e., where the PTFE was buried in or covered by the ULTEM™).

EXAMPLES 6–13

Several samples were prepared as set forth in Example 5, but with varying ratios of acetone (ULTEM™ nonsolvent) to methylene chloride (ULTEM™ solvent). Moldings were made from each sample, as set forth above, and the resistivities thereof tested. The results are set forth in Table I.

TABLE I

| SAMPLE | ACETONE (gs) METHYLENE CHLORIDE (gs) | ELECTRICAL RESISTIVITY |
|---|---|---|
| 6 | 0 | 0.29 |
| 7 | 0.07 | 0.34 |
| 8 | 0.08 | 0.87 |
| 9 | 0.09 | 0.78 |
| 10 | 0.10 | 0.69 |
| 11 | 0.11 | 0.69 |
| 12 | 0.12 | 0.61 |
| 13 | 0.20 | 0.31 |

The presence of a nonsolvent is known to affect the solubility and conformational structure of a polymer. The data shown in Table I shows the impact of various concentrations of the nonsolvent (i.e., acetone) in the solvent (i.e., methylene chloride) on ULTEM™ coated iron particles. More specifically, the data shows that the lowest resistivities occur when no nonsolvent is present and the solvent significantly dissolves the ULTEM™ coating, (sample 6) or when the concentration of the nonsolvent is so high that little swelling or tackifying of the surface occurs (sample 13). In between these extremes, and particularly at acetone/methylene chloride ratios of about 0.08 and 0.09, much higher resistivities are obtained. In this middle range of ratios the polymer swells and becomes sticky enough to adhere the lubricant particles to the surface thereof rather than dissolve appreciably in the solvent only to redeposit and cover up the PTFE particles.

EXAMPLE 14

Iron powder was coated with ULTEM™ in the same manner as Example 1. The thusly coated iron powder was then mixed with a slurry comprising 0.03 g of PTFE (MP1100) in a solution of 0.03 g of poly(methyl methacrylate) dissolved in 3 g of acetone. Upon removal of the acetone, the PTFE become buried in, and covered by, the methyl methacrylate binder on the surface of the shell as described in copending U.S. patent application Ser. No. 08/357,890 supra. When molded as described above, sample 14 (which had significantly more polymer present than the other samples) had a resistivity of about 0.61 ohm-cm which is lower than the highest resistivities reported in samples 8 and 9 above, and only comparable to sample 12.

EXAMPLE 15

Iron powder was coated with ULTEM™ in the same manner as Example 1. The ULTEM™-coated iron powder was then overcoated with 0.03 g of a very high molecular weight poly(methyl methacrylate) from Polysciences Inc. dissolved in 4 g of acetone. The thusly coated iron powder was then mixed with a slurry comprising 0.03 g of PTFE (MP1100) dispersed in a liquid tackifier for the methyl methacrylate comprising 5 g of acetone and 0.40 g of hexane (nonsolvent for the methacrylate). After evaporating the tackifier and molding the particles as set forth above, the resulting molding yielded a resistivity of 1.85 ohm-cm which is about three times (3×) greater than that produced in Example 14 using the same amounts of the same material but with the PTFE buried in, or covered by, the methyl methacrylate.

EXAMPLE 16

Iron powder was coated with ULTEM™ in the same manner as in Example 1. The thusly coated iron powder was then mixed with a slurry comprising 0.03 g of boron nitride, 5 g methylene chloride and 0.4 g acetone. After vaporizing the acetone/methylene chloride and molding the particles as set forth above, the molding demonstrated an electrical resistivity of 0.06 ohm-cm indicating that the hard, abrasive nature of the inorganic particles can reduce the rearrangement freedom of the iron particles during compression and disrupt the insulating polymeric shell to the point where its effectiveness as an insulator is significantly reduced.

EXAMPLE 17

Iron powder was coated with ULTEM™ in the same manner as in Example 1. The thusly coated iron powder was then mixed with a slurry comprising 0.03 g of N,N'-ethylenedbis (stearateamide) particles (i.e., ca. 1–20 micrometers) sold under the name ACRAWAX C™ by LONZA INC. in a liquid mixture comprising 5 g methylene chloride and 0.4 g acetone. After vaporizing the acetone/methylene chloride and molding as set forth above, the molding yielded an electrical resistivity of 0.61 ohm-cm.

While the invention has been described primarily in terms of certain specific embodiments thereof, it is not intended to be limited thereto but rather only to the extent set forth hereafter in the claims which follow.

What is claimed is:

1. A mass of moldable particles for compression molding into a magnetizable product which comprises a plurality of ferromagnetic particles having a first particle size dispersed uniformly throughout a polymer matrix, said moldable particles each comprising a ferromagnetic particle having a shell of said polymer thereabout encapsulating said ferromagnetic particle, said shell having (i) an outer surface layer anchoring a root portion of each of a plurality of organic lubricant particles adhering to said surface, said lubricant particles having a second particle size less than said first particle size, and (ii) an inner layer which is substantially free of said lubricant particles and separating said surface layer from said ferromagnetic particle, said lubricant particles each having a denuded prominent portion extending from said root portion and standing in relief from said surface unimpaired by said polymer.

2. A mass of particles according to claim 1 wherein said lubricant particles are selected from the group consisting of lubricous stearates and fluorocarbons.

3. A mass of moldable particles according to claim 2 wherein said ferromagnetic particles comprise a rare-earth-metal hard magnetic material.

4. A mass of moldable particles according to claim 3 wherein said lubricant particles comprise a stearate.

5. A mass-of particles according to claim 4 wherein said rare earth comprises neodymium, and said stearate comprises ethylene bisstearateamide.

6. A mass of particles according to claim 2 wherein said ferromagnetic particles comprise a soft magnetic material and said lubricant particles comprise a fluorocarbon.

7. A mass of particles according to claim 6 wherein said fluorocarbon comprises polytetrafluoroethylene.

8. A mass of particles according to claim 7 wherein said polytetrafluoroethylene particles comprise about 0.05% by weight to about 0.5% by weight of said mass.

9. A mass of particles according to claim 8 wherein said polytetrafluoroethylene particles comprise about 0.1% by weight to about 0.3% by weight of said mass.

10. A mass of particles according to claim 8 wherein said shell comprises about 0.2% to about 4.25% by weight of said moldable particles.

11. A mass of particles according to claim 10 wherein said shell comprises about 0.5% to about 2% by weight of said moldable particles.

12. A mass of particles according to claim 2 wherein said ferromagnetic particles comprise a hard magnetic material, said polymer shell is selected from the group consisting of polyamides, epoxies and polyvinylidine fluoride.

13. A mass of particles according to claim 12 wherein said lubricant particles comprise ethylene bisstearateamide.

14. A mass of particles according to claim 2 wherein said ferromagnetic particles comprise a soft magnetic material, and said polymer shell is selected from the group consisting of thermoplastic polyetherimides, polyamideimides, polysulfones, polycarbonates, polyphenylene ethers, polyphenylene oxide, polyacyclic acid, polyvinylpyrrolidone and polystyrene maleic anhydride.

15. A mass of particles according to claim 14 wherein said polymer shell comprises polyetherimide and said lubricant comprises a fluorocarbon.

16. A mass of particles according to claim 1 wherein said outer layer comprises a different polymer than said inner layer.

17. A mass of particles according to claim 16 wherein said inner layer comprises polyetherimide and said outer layer comprises an acrylate.

18. A mass of particles according to claim 17 wherein said acrylate comprises methyl methacrylate-butyl methacrylate.

19. A mass of particles according to claim 18 wherein said fluorocarbon comprises polytetrafluoroethylene.

20. A mass of particles according to claim 1 wherein said lubricant particles are selected from the group consisting of cornstarch, fluorocarbons, stearates, polydienes, polyalkenes, polyacrylic acid and derivatives thereof, polystyrenes, polyoxides, polyesters, polycarbonates, polyamides, polyvinyl esters, and polyvinylpyrrolidone.

* * * * *